2,946,744
Patented July 26, 1960

2,946,744

METHOD OF PREPARING ODOR FREE NAPHTHAS

George W. Ayers, Chicago, and William A. Krewer, Arlington Heights, Ill., assignors to The Pure Oil Company, Chicago, Ill., a corporation of Ohio No Drawing. Filed Aug. 26, 1959, Ser. No. 836,054

12 Claims. (Cl. 208—288)

This invention relates to the preparation of odorless industrial naphthas. More particularly, this invention relates to the improvement of the odor quality of odorless naphthas by treatment with an aqueous solution containing an hydroxylamine salt.

Because of the inherent qualities and advantages of odorless naphthas, such as their non-toxicity, good solvent properties, low cost, and availability, they are used in many industrial services, particularly in the surface coating industry. Naphthas are generally defined as hydrocarbon mixtures of various boiling ranges, usually with end boiling points below 550° F., but occasionally between 550° and 600° F. Most of them are obtained by the fractional distillation of petroleum; others are obtained by the fractional distillation of alkylates or of coal tar, or from the solvent extraction of petroleum fractions. Within this definition are included such products as straight-run petroleum naphthas, heavy naphthas, odorless naphthas, coal-tar naphthas, and aromatic petroleum naphthas. All of these naphthas have very pronounced odors except in the case of odorless naphthas as prepared by the fractional distillation of heavy alkylates, or by the treatment of straight-run petroleum naphthas with silica gel. Naphthas boiling below 300° F. are not odorless because the hydrocarbons themselves have odors. Naphthas with initial boiling points between 300° and 350° F., and particularly between 340° and 360° F., may be essentially odorless if prepared by careful fractional distillation of heavy alkylates, or by percolation of straight-run petroleum naphthas of comparable boiling range through silica gel until essentially all of the aromatic hydrocarbons are removed. Fractional distillation of heavy alkylates oftentimes gives unpredictable results and the products may contain small amounts of odorous compounds, the exact composition of which is unknown but which may include aldehydes, ketones, sulfur compounds, or even unsaturated hydrocarbons. Many of the odorous compounds are very tenacious and the odor of the naphtha product is little improved, or even made more disagreeable, by ordinary caustic soda treatment. Specific applications of odorless naphthas require that they be of high and uniform quality. This invention is directed to one of the more perplexing problems, that of improving the odor of such naphthas so that uniform, commercially-acceptable products are obtained.

Although many refining processes are available which remove substantial amounts of obnoxious sulfur compounds which impart odors to naphthas, these processes do not always give results which are consistent, and such processes are not applicable to heavy alkylates. There are many claims made in the art to processes for removing odorous compounds from hydrocarbons or changing them into less odorous substances. These processes may be classified as sweetening, solvent extraction, and adsorption processes. However, because of the peculiar nature of odor formation in naphthas, these prior art chemical and physical methods cannot be depended upon to give uniform results.

In accordance with the present invention, it has been found that the odor quality of essentially odorless naphthas is improved and the odor stability maintained during storage or extended periods of use, by treatment with solutions, particularly aqueous solutions, containing an hydroxylamine salt and an alkali metal hydroxide. It has been found that in treating essentially odorless naphthas with aqueous solutions containing an hydroxylamine salt and an alkali metal hydroxide, the odorous materials are destroyed or removed. The reaction of the aqueous treating agent of this invention and the odorous materials is quite rapid and the treatment can be effected by countercurrent continuous processing of the nearly-odorless naphtha, using known liquid-liquid contact methods. The treating operation may be carried out at temperatures from room temperature to as high as 200° F., the lower temperature limit being that at which the treating solution is still fluid. The process of this invention may be conducted batchwise by mixing together the naphtha and the hydroxylamine-alkali treating solution and allowing phase separation wherein the odor-free naphtha forms the upper phase. Other methods of application will become apparent from a further description of this invention.

Accordingly, it becomes a primary object of this invention to provide a process of preparing odorless industrial naphthas.

The second object of this invention is to provide a process for preparing odorless industrial naphthas by treatment of unstable but nearly odor-free naphthas with an aqueous solution containing an hydroxylamine salt and an alkali metal hydroxide.

Still another object of this invention is to provide a process for removing odorous materials from hydrocarbon mixtures, particularly heavy alkylates, by treatment or extraction with aqueous alkali solutions containing an hydroxylamine salt.

These and further objects of the invention will become apparent or be described as the specification herein proceeds.

In order to demonstrate the invention, the following examples are presented:

EXAMPLE I

A 90 cc. portion of a poor-odor-quality odorless naphtha having a boiling range of about 350° to 400° F. and obtained by the steam distillation of heavy alkylate originating from alkylate prepared by the sulfuric acid process, was shaken for 10 minutes with a 10 cc. portion of an aqueous solution prepared by dissolving 10 grams of hydroxylamine hydrochloride and 6.3 grams of sodium hydroxide in 90 cc. of water. After this treatment, the naphtha and aqueous phases were separated. Following this, the naphtha was water-washed with 10% volume portions of water until the washings were neutral to phenolphthalein indicator. The washed product was tested for odor and found to show a great improvement in odor quality. It had very little odor and was very suitable for marketing.

EXAMPLE II

A similar treatment of 100 cc. of the original odorless naphtha of poor odor quality with 10 cc. of water was without effect on the odor quality, and the product remained unmarketable.

EXAMPLE III

Using the conditions of Example I, a treating solution comprising 5% aqueous sodium hydroxide was used to treat another 90 cc. portion of the poor quality odorless naphtha. The odor of the product was unpleasant, rendering it unmarketable as a naphtha.

EXAMPLE IV

About 9 parts of odorless naphtha as previously identified and one part of liquid ammonia were contacted for 10 minutes at a temperature of −40° to −45° F. Following this, the naphtha was washed with 10% volume portions of water until the washings were neutral to phenolphthalein indicator. The washed product had sufficient odor to make it unmarketable.

EXAMPLE V

The conditions of Example I were repeated using an aqueous solution containing 4 weight percent hydroxylamine hydrochloride in liquid ammonia. After being water washed to neutrality, the naphtha phase had a slight but pleasant odor, and was unmarketable.

EXAMPLE VI

A 90 cc. portion of poor-odor-quality odorless naphtha (the alkylate previously described) was shaken for 10 minutes with an aqueous solution containing 2.5 weight percent hydroxylamine hydrochloride and 5 weight percent sodium hydroxide. The treated naphtha was washed with 10% by volume portions of water until the washings were neutral to phenolphthalein indicator. The product separated was essentially odorless and marketable.

In view of the foregoing examples, it is seen that water alone, alkali alone, and liquid ammonia alone are ineffective in removing the odorous materials from "odorless" naphthas. However, quite unexpectedly, the combination of aqueous alkali and hydroxylamine hydrochloride has the property of transforming an unmarketable product to one which is marketable as far as the odor is concerned. In the foregoing examples, the volume ratio of naphtha to treating solution was maintained at about 10-to-1. In general, this represents a rather low volume ratio, and volume ratios as high as 500-to-1 may be successfully employed. The temperature of treatment in the foregoing examples was about 85° F., except in the case of liquid ammonia. In general, the temperature may vary from ambient temperatures, which are preferred, up to as high as 200° F., that is, a temperature at which the treating solution is fluid and homogeneous. The volume ratio of naphtha to treating solution during countercurrent treatment is preferably maintained at about 2-to-1 to 50-to-1.

The treating solution containing hydroxylamine and free sodium hydroxide is obtained by adding to water hydroxylamine hydrochloride and an excess of sodium hydroxide over that required to liberate hydroxylamine from the hydrochloride. The treating solutions used in this invention can also be prepared by using hydroxylamine nitrate or hydroxylamine sulfate instead of the hydroxylamine hydrochloride.

The treating solutions may also be prepared by adding free hydroxylamine, which has a boiling point of about 56.5° C. at 22 mm. of Hg, and sodium hydroxide to water. If free hydroxylamine is used, it is desirable to have fresh material available since this material on storage for a long time develops odorous decomposition products which are deleterious to the naphtha during treatment.

The treating solutions, as before stated, may contain 0.1 to 25 parts by weight of hydroxylamine (as the free base) added either as the free compound or as the salt, and about 0.1 to 30 parts by weight of sodium, potassium, cesium, or rubidium hydroxide. Although the presence of free alkali greatly speeds up the reaction of hydroxylamine with the oxygen-containing odorous compounds which may be in the form of aldehydes and ketones, it is not necessary for purposes of this invention. Solutions of hydroxylamine alone in the order of 1 to 15%, or solutions containing an hydroxylamine salt with an insufficient amount of alkali to free all of the hydroxylamine may also be used in treating essentially odorless naphthas. However, in the use of solutions that do not contain free alkali metal hydroxide, it is preferable that the contact time be increased. If hydroxylamine salts are used, the alkali may be added in increments as the treating solution is used over and over with different batches of essentially odorless naphtha. Hydroxylamine salts are the best sources of hydroxylamine for treating solutions for essentially odorless naphthas, since they are stable and do not form odorous compounds on storage or during handling which could damage the odor quality of the naphtha during treatment.

However, the use of free caustic, that is, an excess over that required to free hydroxylamine from its salts, in the treating solution is desirable since oximes, that is, the reaction products of aldehydes and ketones with hydroxylamine, are weakly acidic compounds which are soluble in caustic solutions and are thus removed in the treating solution.

The naphthas that can be treated in accordance with this invention include, (1) heavy alkylates or heavy alkylate fractions boiling from 300° F. to as high as 600° F. and which contain small amounts or traces of odorous materials arising during manufacturing or processing steps, or during storage; and (2) petroleum fractions boiling from about 300° F. to 600° F. which have been essentially denuded of their aromatic content by treatment with silica gel. The invention has particular application to naphthas boiling in the range of 300°–525° F., including heavy alkylate fractions prepared by the distillation of heavy alkylates at pressures lower than atmospheric and/or with steam. The heavy alkylates are obtained as bottoms from the distillation of alkylates, and may constitute 5–20% of the whole alkylates. Alkylates are produced by the alkylation of olefins with alkanes. An example of such material is the product of the alkylation of isobutylene with isobutane in the presence of hydrofluoric acid.

The following table gives the distillation characteristics of a number of naphthas which can be treated in accordance with this invention.

*Tests on representative odorless naphthas and heavy alkylates*

| API Grav. | Distillation | | | | | | | | | | | | | | | | Odor |
|---|---|---|---|---|---|---|---|---|---|---|---|---|---|---|---|---|---|
| | IBP | 5% | 10% | 20% | 30% | 40% | 50% | 60% | 70% | 80% | 90% | 95% | E.P. | Percent Rec. | Percent Res. | Percent Loss | |
| 54.0 [1] | 347 | 354 | 356 | 358 | 360 | 363 | 366 | 369 | 374 | 383 | 414 | 466 | 517 | 98.0 | 1.6 | 0.4 | slight (essentially odorless). |
| 54.5 [2] | 352 | 358 | 360 | 360 | 361 | 362 | 362 | 363 | 364 | 366 | 379 | 377 | 393 | 98.8 | 1.2 | 0.0 | Do. |
| 53.6 [2] | 360 | 367 | 368 | 369 | 369 | 370 | 371 | 372 | 373 | 376 | 380 | 388 | 413 | 98.6 | 1.2 | 0.2 | Do. |
| 51.4 [2] | 372 | 378 | 380 | 382 | 385 | 388 | 392 | 397 | 408 | 425 | 481 | 540 | 573 | 99.0 | 1.0 | 0.0 | Do. |
| 51.4 [2] | 361 | 366 | 368 | 371 | 373 | 376 | 381 | 386 | 396 | 416 | 468 | 509 | 543 | 98.1 | 1.4 | 0.5 | Do. |
| 55.4 [1] | 351 | 354 | 355 | 356 | 357 | 358 | 359 | 360 | 362 | 365 | 368 | 372 | 385 | 98.7 | 1.3 | 0.0 | Do. |
| 54.1 [1] | 355 | 359 | 360 | 363 | 364 | 367 | 369 | 373 | 379 | 388 | 418 | 463 | 512 | 98.4 | 1.1 | 0.5 | Do. |
| 55.2 [1] | 348 | 362 | 353 | 355 | 356 | 357 | 359 | 361 | 363 | 365 | 370 | 377 | 406 | 98.8 | 1.2 | 0.0 | Do. |

[1] Made from alkylate produced by the hydrofluoric acid process.
[2] Made from alkylate produced by the sulfuric acid process.

What is claimed is:

1. A method of preparing odor-free naphthas which comprises treating said naphthas with an aqueous solution containing an hydroxylamine and alkali metal hydroxide.

2. The method in accordance with claim 1 in which said hydroxylamine is obtained from hydroxylamine salts.

3. The method in accordance with claim 2 in which the hydroxylamine salts are selected from the group consisting of hydroxylamine hydrochloride, hydroxylamine nitrate and hydroxylamine sulfate.

4. The method in accordance with claim 1 in which the treatment is conducted at a temperature of about 35° to 200° F.

5. The method in accordance with claim 1 in which the naphtha boils between about 300° to 600° F. and is characterized by odor instability.

6. The method in accordance with claim 5 in which the naphtha is a heavy alkylate fraction boiling in the range of about 340° to 575° F.

7. A method of preparing odor-free naphthas which comprises treating odorous naphthas with an aqueous solution containing about 0.1 to 25 parts by weight of hydroxylamine and about 0.1 to 30 parts by weight of an alkali metal hydroxide.

8. The method in accordance with claim 7 in which the hydroxylamine is obtained from hydroxylamine salts.

9. The method in accordance with claim 8 in which the hydroxylamine salts are selected from the group consisting of hydroxylamine hydrochloride, hydroxylamine nitrate and hydroxylamine sulfate.

10. The method in accordance with claim 7 in which the treatment is conducted at a temperature of about 35° to 200° F.

11. The method in accordance with claim 7 in which the naphtha boils between about 300° to 600° F. and is characterized by odor instability.

12. The method in accordance with claim 11 in which the naphtha is a heavy alkylate fraction boiling in the range of about 340° to 575° F.

References Cited in the file of this patent

UNITED STATES PATENTS

| | | |
|---|---|---|
| 2,321,884 | Allam | June 15, 1943 |
| 2,589,450 | Stanton | Mar. 18, 1952 |